US007308914B2

(12) United States Patent
Parekh

(10) Patent No.: US 7,308,914 B2
(45) Date of Patent: Dec. 18, 2007

(54) DEVICE FOR INSTANT MANUFACTURE OF CUSTOMIZED PAINT, A CONTROL SYSTEM FOR USE IN THE SAID DEVICE AND A PROCESS FOR MAKING THE PAINT USING THE DEVICE

(75) Inventor: Madhukar Balvantray Parekh, Mumbai (IN)

(73) Assignee: Pidilite Industries Limited, Mumbai (IN)

( * ) Notice: Subject to any disclaimer, the term of this patent is extended or adjusted under 35 U.S.C. 154(b) by 194 days.

(21) Appl. No.: 10/532,066

(22) PCT Filed: Oct. 17, 2003

(86) PCT No.: PCT/IN03/00338

§ 371 (c)(1),
(2), (4) Date: Apr. 20, 2005

(87) PCT Pub. No.: WO2004/035695

PCT Pub. Date: Apr. 29, 2004

(65) Prior Publication Data

US 2006/0011259 A1 Jan. 19, 2006

(30) Foreign Application Priority Data

Oct. 21, 2002 (IN) .................................. 917/02

(51) Int. Cl.
*B65B 1/30* (2006.01)
(52) U.S. Cl. .................. 141/83; 141/104; 141/105; 141/192
(58) Field of Classification Search .................. 141/2, 141/9, 83, 100–106, 192, 247; 53/168, 237; 356/402, 403; 702/32
See application file for complete search history.

(56) References Cited

U.S. PATENT DOCUMENTS

| 4,813,000 A | | 3/1989 | Wyman et al. | |
| 5,493,840 A | * | 2/1996 | Cane | 53/50 |
| 6,073,055 A | | 6/2000 | Jahn et al. | |
| 6,522,977 B2 | | 2/2003 | Corrigan et al. | |
| 6,701,977 B2 | * | 3/2004 | Taylor et al. | 141/83 |
| 6,769,462 B2 | * | 8/2004 | Larson et al. | 141/83 |
| 2006/0260714 A1 | * | 11/2006 | Heatley et al. | 141/329 |

* cited by examiner

*Primary Examiner*—Timothy L. Maust
(74) *Attorney, Agent, or Firm*—Rader, Fishman & Grauer, PLLC

(57) ABSTRACT

A device for instant manufacture of customized paint which comprises a container housing at least two cans, the cans are interconnected by means of a pipe, the pipe having valves which operate on electronic signals, connected to a pump the pump being provided with a variable frequency drive the paint container being removably placed on a weighing platform the weight being transmitted to a control system to control the variable frequency drive, pump and valve and the control system, the weighing platform being connected to a central processing unit, the terminals of which being connected to the LCD a smart card, memory and to a digital input/output device appropriately and the output of the digital input/output device being connected to a relay board and the output of the relay board connected to the variable frequency drive, to the valves and membrane keyboard for human interface.

15 Claims, 5 Drawing Sheets

DEVICE FOR INSTANT MANUFACTURE OF CUSTOMIZED PAINT, A CONTROL SYSTEM FOR USE IN THE SAID DEVICE AND A PROCESS FOR MAKING THE PAINT USING THE DEVICE

FIELD OF THE INVENTION

This invention relates to a device for instant manufacture of customized paint. The device of the present invention is useful for the manufacture of the desired paint at the point of sale (retailer or stockist). The device of the present invention facilitates not only instant manufacture of paint of desired quality but also in desired quantity at an affordable cost to the customer. Further, by employing the device of the present invention, the customer can manufacture paint nearest to his/her choice at a cost, which is in the desired range by mixing and matching properties of grades of paints available in the market. For example, a particular paint available in market is very good in hiding, but less in wet scrub than desired. Using the present invention, customer can retain the hiding property, as well as increase the wet scrub by accepting a slightly higher cost or compromise slightly on hiding and get higher wet scrub at same cost. Thus the customer can adjust the properties like the contrast ratio (hiding), whiteness, wet scrub, colour depth, gloss, stain resistance, etc. using the above menu-driven machine. In other words, the device of the present invention is useful for manufacture of all types of paints with infinite combinations of properties and is a unique one.

The invention also relates to a Control system useful in the above mentioned device and a process for making the paint using the device.

The paint manufactured using the device of the present invention can be applied on surfaces such as interior or exterior walls of any building, or any structure.

BACKGROUND OF INVENTION

There are, currently, a variety of paints and protective coatings available in the market, which are useful for applying onto surfaces of buildings and structures. Presently these paints and coatings are manufactured in factories and supplied in several pack sizes and grades. The customer has to be content by selecting the readymade paints or coatings from the limited choice of pack sizes, quality and price range available in the market. The customer cannot select the precise quantity required or the precise price range based on his/her own preferences.

Presently paints and coatings are manufactured in bulk in plants and are distributed in different size packs through distributors and retailers. For a particular grade of paint, a minimum bulk back size has to be made. Inventory of different grades of readymade paints has to be maintained. Sometimes, non-moving stock may lead to dead stock & expiry of shelf life.

Currently there is no system—apparatus or process—by which a customer can select the ingredients and manufacture the desired quality of the paint of his/her choice at a cost, which he/she can afford. In the present times, the customization is limited to the selection of colours for standard quality/grade of Base Paint. Base paint of few standard types is manufactured in a factory and it is used for colouring. It is not possible to alter the properties of the base paint through this tinting/colouring device. Customer can choose a particular shade from thousands of shades of colour as shown on the displayed shade card. This chosen colour is entered into Automatic Colourant Dispensing Machine, which dispenses colourants into pre-filled base paint containers to create the desired colour. Colourant quantity for particular base paint and shade is stored in the computer.

If a customer's paint colour needs to match a particular sample colour, then this sample colour is read by spectrophotometer and colour value is determined. This colour value is then converted by colour matching program of machine to produce a recipe of colourants to achieve this colour for the Base Paint. These colourants are dispensed by machine into the base paint to create the desired colour.

The applicants being in the field of manufacture of paints and coatings, thought about the advantages of providing a system—apparatus/process—which will facilitate manufacture of paint having customer's choice of properties and at affordable cost, at the point of sale, (such as the shop of the retailer or stockist). A system for the manufacture of customized paint with infinitely variable combination of properties and at a cost desired by the customer is currently not available. Therefore, the invention for which protection is sought for in this application is novel.

In other words, by providing a system, which will facilitate instant manufacturing of customized paint at the point of purchase, the customer will be placed in an advantageous position, because, such a system will help the customer to select a combination of functional parameters of the paint, price range for the paint and quantity of paint whereby the device with the help of embedded control system will determine the exact proportion in which the ingredients are to be mixed and dispensed, and carry out the mixing process, then dispense the paint immediately.

Recognizing the importance of such a system namely, a device/process, the applicants took up research & development work to develop a device/process for instant manufacture of customized paint.

Therefore, the main objective of the present invention is to provide a device for instant manufacture of customized paint by choosing from infinitely variable combination of properties.

OTHER OBJECTIVES CAN BE SUMMARIZED AS FOLLOWS 1. to provide a device for instant manufacture of customized paint at the point of purchase overcoming the limitations of the present day paints.
2. to provide a device for instant manufacture of customized paint, which allows the customer to select the paint quality parameters, required by him/her and at a cost which he/she can afford.
3. to provide a device for instant manufacture of customized paint, which helps in the possibility of infinitely varying combinations of the ingredients used to get a variety of paints.
4. to provide a device for instant manufacture of customized paint by which the customer pays for exactly what he/she wants and is not charged an average/general cost, which is the case with prior art, thereby giving him/her the best value for money.
5. To provide a device for instant manufacture of customized paint in which the customer can select and incorporate in the paint, in a cost effective manner, properties required for specific applications such as various interior areas of his/her house, which need painting like, ceiling, walls of living room, bedrooms, kitchen, bathroom, etc., which need different properties of paint. For example, the paint for coating the ceiling may require very high whiteness, low to medium wet scrub, lower colour depth and high opacity at a lower cost. The paint required for walls of the drawing room & bedroom may require medium wet scrub, lower colour depth, etc. The paint required for kitchen may require high stain resistance and wet scrub for easy cleaning of food stains, etc.

6. to provide a device for instant manufacture of customized paint which facilitates the customer to select a paint such as white base suitable for his/her choice of colour depth, etc. which can later be coloured using required stainers to achieve, higher colour depth capability for deeper shades, etc.
7. to provide a device for instant manufacture of customized paint having a compact design, which can be easily assembled at the desired site such as distributor's site.
8. to provide a device for instant manufacture of customized paint, which can be operated by a layman without any skill.
9. to provide an embedded control system, control logic to translate the wish of the customer to sequence of operation of various components of the device with the help of the software for instant manufacture of customized paint.
10. to provide a process for the instant manufacture of customized paint employing the device of the present invention.

The invention has been developed on the basis of our findings, on sustained R & D, that if a device is fabricated and provided with a control system driven by a software program (i) which will calculate ingredients to manufacture paint within the budget while keeping in view the desired properties/requirements/applications (ii) which will convert desired properties/requirements of customer into proportion and quantity of each paint ingredients, (iii) and which will dispense the paint ingredients used in the manufacture of paints automatically at defined quantities and proportions (iv) mixing of the selected and dispensed paint ingredient quantities and proportions at the site, to achieve the final Paint satisfying all the desired requirements of customer, the above objectives can be achieved.

The invention is described with reference to the figures shown in the drawings accompanying this specification as an illustration. Invention can, however, be used for manufacture of paints with broader selection of performance parameters than described in the illustration.

In the attachments,

Figure 5:
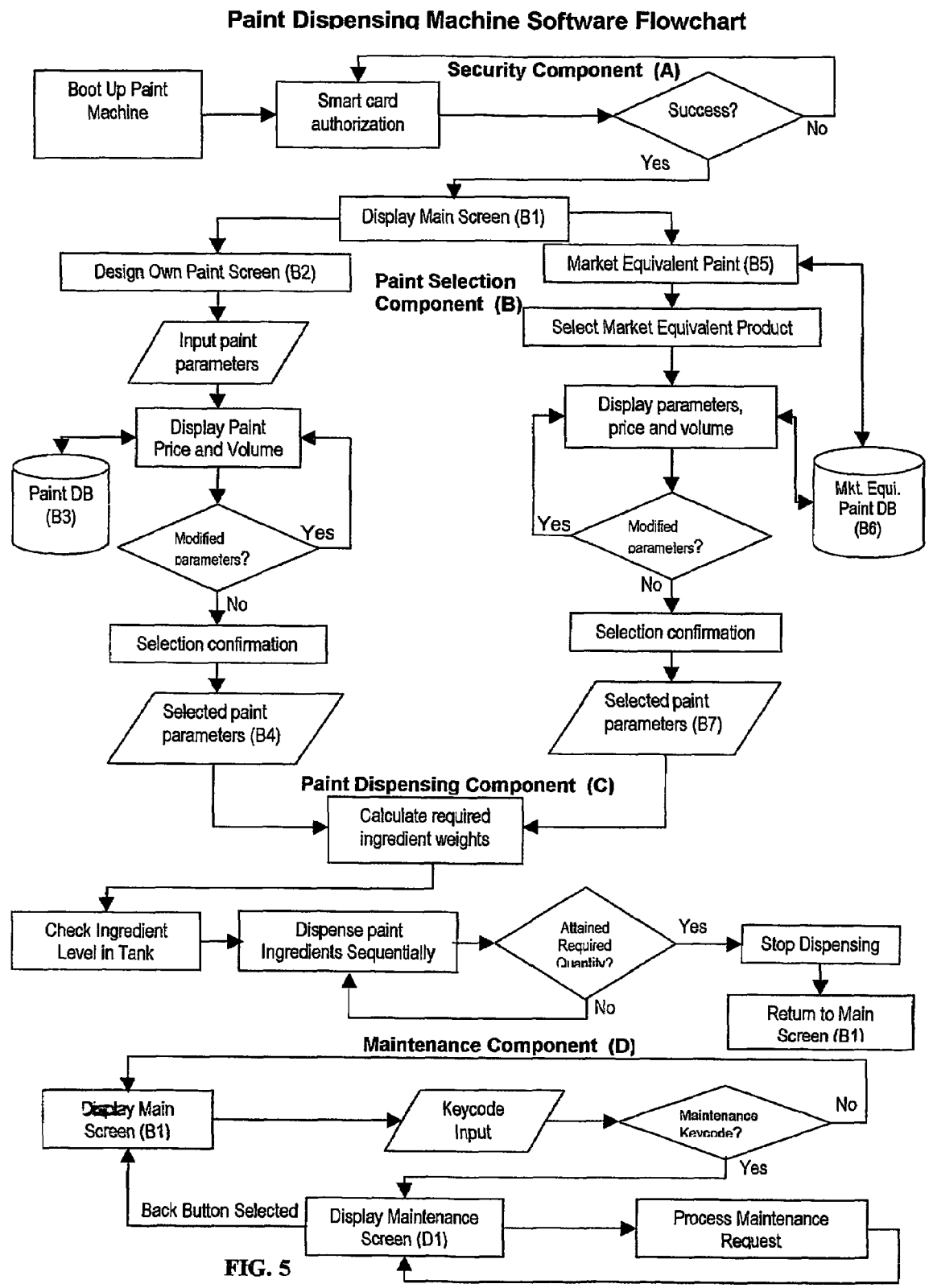

FIG. 5 represents the flow chart of the software for the operation of the device Accordingly, the present invention provides a device for instant manufacture of customized paint which comprises a container (1) housing at least two cans (2) for holding the ingredients useful for preparing the paint, each can being provided with an opening through which the cans are interconnected by means of a pipe (3), the pipe (3) being provided with valves (4) which operate on electronic signals for adjusting the flow of the said ingredients from the said cans (2), the pipe (5) being connected to a pump (6) for pumping the said ingredients from the said cans (2) into the paint container (7), the pump (6) being provided with a variable frequency drive (VFD) (8) for varying the flow rate of the quantities of the said paint ingredients from the said cans (2) to the container, the paint container (7) being removably placed on a weighing platform (9), for weighing the paint formed in the paint container (7), the weight being transmitted to a control system (10), to control the variable frequency drive (VFD) (8), pump (6) and valve (4), the control system (10), comprising an embedded controller having a LCD (liquid crystal display) (11) provided with a central processing unit (14), the output of weighing platform (9) being connected to the central processing unit (14), one terminal of the central processing unit being connected to the LCD (liquid crystal display) (11), second terminal of the cent processing unit (14) being connected to a smart card (15), the third terminal of the central processing unit interacting with the memory (17), the fourth terminal of the central processing unit being connected to the input of the digital input/output device (16), the fifth terminal of the central processing unit being connected to membrane keyboard (12) for human interface, the output of the digital input/output device (16) being connected to a relay board (18), and the output of the relay board (18) being connected to the variable frequency drive (8) and to the valves (4).

According to another embodiment of the present invention it is provided with a control system (10) for use in a device as defined above which comprises an embedded controller having a LCD (liquid crystal display) (11) provided with a central processing unit (14), the output of weighing platform (9) being connected to the central processing unit (14), one terminal of the central processing unit being connected to the LCD liquid crystal display) (11), second terminal of the central processing unit (14) being connected to a smart card (15), the third terminal of the central processing unit interacting with the memory (17), the fourth terminal of the central processing unit being connected to the input of the digital input/output device (16), the fifth terminal of the central processing unit being connected to membrane keyboard (12) for human interface, the output of the digital input/output device (16) being connected to a relay board (18), and the output of the relay board (18) being connected to the variable frequency drive (8) and to the valves (4).

According to another embodiment of the present invention it is provided with a method for instant manufacturing of customized paint using the device as defined above.

According to yet another feature of the invention, there is provided a software for the operation of the device as shown in the FIG. 5

Figure 1:
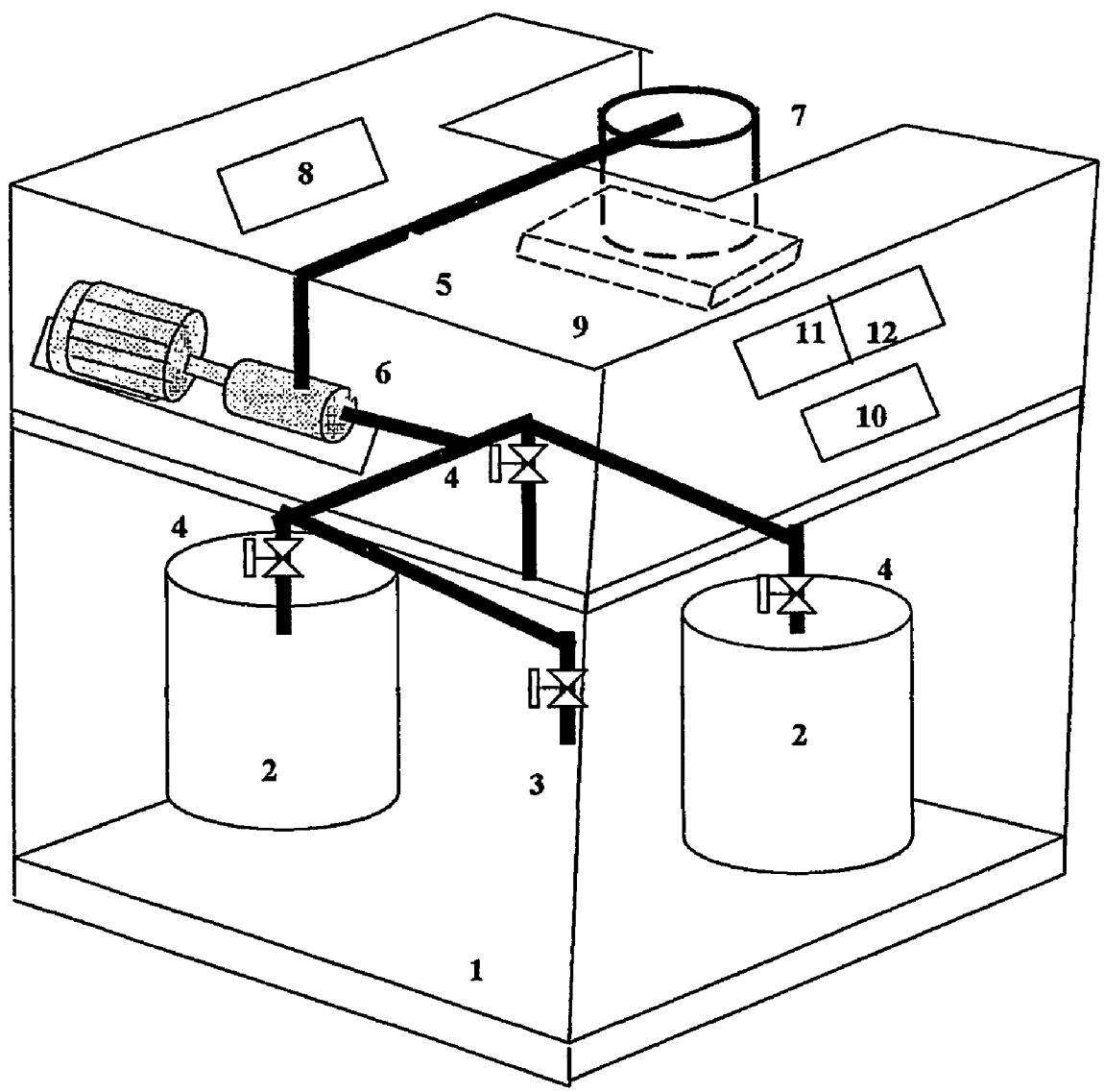
FIG. 1 shows an embodiment of the device of the present invention, representing a plan view of the device (having two cans without the rollers).
Figure 2:
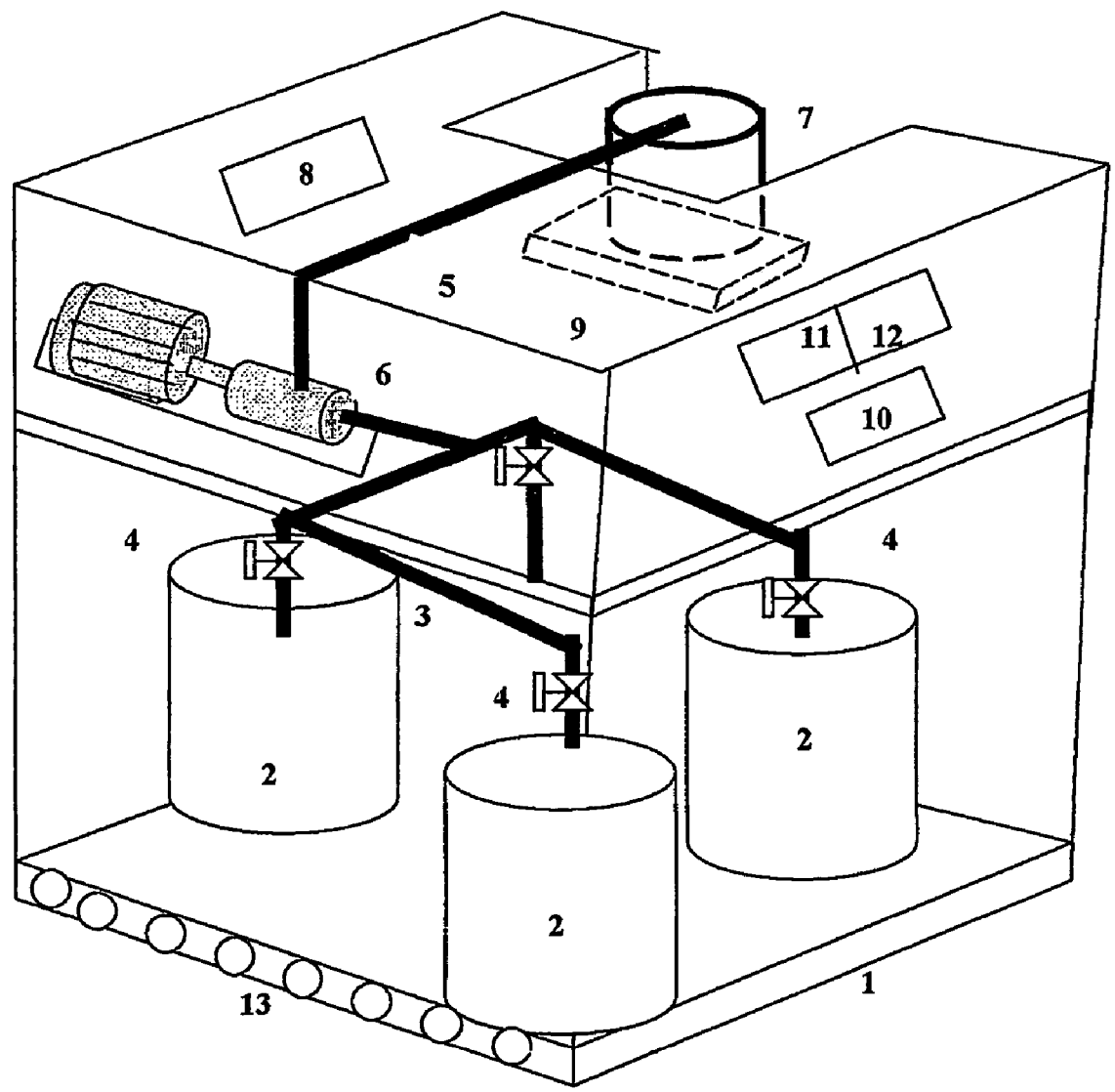
FIG. 2 represents the plan view of another embodiment of the device of the present invention (having three cans with rollers).

In a preferred embodiment of the invention, the main container housing (1) may be partly closed as shown in FIG. 1. It may also be provided with rollers (13) to facilitate easy installations of the paint ingredient cans (2) as shown in FIG. 2.

Though the invention has been described with reference to two and three cans for holding the ingredients, it is to be noted that it can have more than two/three cans depending upon the choices of ingredients required for the manufacture of the paints. The openings in the cans may preferably be at their top. The cans are interconnected by means of a pipe (3), which may be made of rubber, plastic, stainless steel. The pipe is provided with valves (4), each can having separate valves. Though any type of valves, which operate on receiving electronic signals, may be used for adjusting the flow of the said ingredients from the cans (2), it is preferable to use an electrically operated valve. Similarly, while any pump (6) may be used, it is preferable to use a screw pump with variable frequency drive (VFD) considering the accuracy at which the paint ingredients are dispensed. At high speed the pump dispenses 80% of the paint ingredients and the remaining 20% is dispensed at low speed for accurate cut off.

The cans (2) used for holding the ingredients may be of suitable sizes, such as 50 liters, 100 liters, 50 litres, 200 litres drums and the like, based on the appropriate use of the device at the point of Sale (Retailer or Stockist or Depot).

The ingredients used in the cans (2) incorporated in the device of the present invention may be selected from the following: Filler base comprising blends of extenders like talc, china clay, calcite, etc., $TiO_2$ base comprising Titanium Dioxide, Emulsion base comprising a high binding emulsion polymer along with Theological modifiers, etc. Each can (2) will contain the individual ingredients. These 3 cans are preferred arrangement. Additional cans be used for separate emulsion polymer for exterior paint additives.

The pump is controlled by the control system. The control system selects one ingredient for dispensing at a time & sequentially dispenses all the other ingredients. The speed of the motor does the coarse and fine feed arrangement. The motor speed is regulated to dispense 80% of the required quantity at high speed and for balance 20%, motor runs at a lower speed. It also measures the paint container weight through the load cell & controls the pump speed through variable frequency drive (VFD). After addition of all the ingredients, the filled paint container is closed and taken out from the device and mixed thoroughly. The mixing can be effected preferably by keeping the container kept inside a gyro-shaker for sufficient period say about 3 minutes for thorough mixing of the ingredients.

The data used in the device of the present invention is based on empirical data, derived from various combinations of paint ingredients. For example, the data incorporated in the device of the present invention may consist of the following information:

| S.NO. | F.B. | TB | E.B. | Hiding | Whiteness | Wet Scrub | Gloss @ 85° | Colour Strength | WPL | Cost/Ltr (Rs.) |
|---|---|---|---|---|---|---|---|---|---|---|
| 1 | 95 | 0 | 5 | 92.92 | 78.338 | 70 | 6.1 | 14.82 | 1.477 | 39.50 |
| 2 | 92.5 | 0 | 7.5 | 92.05 | 76.653 | 195 | 6.3 | 13.81 | 1.460 | 41.00 |
| 5 | 92.5 | 2.5 | 5 | 91.76 | 78.978 | 95 | 3.5 | 17.14 | 1.481 | 45.00 |
| 8 | 85 | 2.5 | 12.5 | 89.29 | 73.841 | 900 | 3.3 | 13.08 | 1.434 | 49.00 |
| 9 | 90 | 5 | 5 | 94.83 | 79.102 | 105 | 4.7 | 18.77 | 1.486 | 50.00 |
| 12 | 82.5 | 5 | 12.5 | 91.93 | 78.084 | 920 | 2.8 | 14.96 | 1.438 | 54.00 |
| 13 | 87.5 | 7.5 | 5 | 96.61 | 81.386 | 75 | 5.2 | 21.19 | 1.491 | 55.50 |
| 16 | 80 | 7.5 | 12.5 | 91.51 | 78.941 | 1010 | 3.9 | 16.06 | 1.442 | 59.00 |
| 17 | 85 | 10 | 5 | 95.75 | 82.637 | 95 | 3.5 | 21.05 | 1.495 | 60.50 |
| 18 | 82.5 | 10 | 7.5 | 94.81 | 81.658 | 170 | 3.1 | 21.07 | 1.479 | 62.00 |
| 21 | 80 | 12.5 | 7.5 | 95.22 | 83.12 | 235 | 3.4 | 22.35 | 1.483 | 67.00 |
| 24 | 72.5 | 12.5 | 15 | 90.73 | 79.806 | 2000 | 4 | 17.98 | 1.436 | 70.50 |
| 25 | 77.5 | 15 | 7.5 | 95.78 | 86.965 | 360 | 3.7 | 23.73 | 1.488 | 72.50 |
| 28 | 70 | 15 | 15 | 95.01 | 87.01 | 1800 | 4.2 | 19.23 | 1.440 | 75.50 |
| 29 | 72.5 | 17.5 | 10 | 96.51 | 87.88 | 625 | 4.3 | 23.59 | 1.476 | 79.00 |
| 30 | 70 | 17.5 | 12.5 | 95.94 | 87.176 | 925 | 3.5 | 21.94 | 1.460 | 80.00 |
| 31 | 67.5 | 17.5 | 15 | 94.97 | 86.401 | 2020 | 3.4 | 21.37 | 1.444 | 81.00 |
| 32 | 65 | 17.5 | 17.5 | 93.68 | 85.83 | 2300 | 4.6 | 19 | 1.599 | 82.00 |
| 35 | 65 | 20 | 15 | 95.55 | 82.844 | 1890 | 3.6 | 21.26 | 1.449 | 86.00 |
| 36 | 62.5 | 20 | 17.5 | 95.09 | 86.834 | 2300 | 3.6 | 19.43 | 1.433 | 87.00 |
| 37 | 67.5 | 22.5 | 10 | 97.21 | 88.394 | 720 | 4.9 | 24.93 | 1.485 | 89.50 |
| 38 | 65 | 22.5 | 12.5 | 95.53 | 88.193 | 960 | 4.1 | 23.09 | 1.469 | 90.50 |
| 41 | 62.5 | 25 | 12.5 | 96.42 | 88.271 | 820 | 4.8 | 24.05 | 1.474 | 96.00 |
| 42 | 60 | 25 | 15 | 96.39 | 88.168 | 1700 | 4.4 | 23.55 | 1.458 | 97.00 |
| 43 | 57.5 | 25 | 17.5 | 96.99 | 88.742 | 1820 | 4.4 | 21.3 | 1.442 | 97.50 |
| 47 | 60 | 27.5 | 12.5 | 97.4 | 86.685 | 1100 | 4.9 | 27.44 | 1.478 | 101.00 |
| 48 | 57.5 | 27.5 | 15 | 95.1 | 86.617 | 1800 | 58 | 25.87 | 1.462 | 102.00 |
| 51 | 57.5 | 30 | 12.5 | 99.04 | 86.659 | 950 | 5.8 | 29.09 | 1.483 | 107.00 |
| 54 | 50 | 30 | 20 | 96.132 | 86.863 | 3300 | 5 | 25.12 | 1.435 | 109.00 |
| 55 | 52.5 | 32.5 | 15 | 96.7 | 87.708 | 1900 | 5.4 | 27.39 | 1.471 | 113.00 |
| 56 | 50 | 32.5 | 17.5 | 96.47 | 87.309 | 2500 | 5.5 | 26.11 | 1.455 | 113.50 |
| 59 | 50 | 35 | 15 | 98.772 | 88.878 | 2050 | 7.9 | 27.89 | 1.476 | 118.50 |
| 60 | 48.5 | 35 | 17.5 | 97.13 | 86.994 | 2250 | 5.9 | 26.89 | 1.460 | 119.50 |
| 63 | 47.5 | 37.5 | 15 | 98.86 | 88.207 | 1800 | 7.9 | 28.54 | 1.480 | 124.00 |
| 66 | 40 | 37.5 | 22.5 | 97.13 | 85.972 | 4000 | 6.3 | 23.64 | 1.433 | 125.00 |
| 67 | 42.5 | 40 | 17.5 | 98.728 | 88.836 | 2300 | 8.2 | 27.47 | 1.469 | 130.00 |
| 68 | 40 | 40 | 20 | 98.34 | 88.112 | 3200 | 8.1 | 26.44 | 1.453 | 130.50 |
| 71 | 40 | 42.5 | 17.5 | 96.322 | 88.527 | 2300 | 9.2 | 29.08 | 1.473 | 135.00 |
| 72 | 37.5 | 42.5 | 20 | 96.51 | 88.324 | 3200 | 8.8 | 27.41 | 1.457 | 135.50 |
| 75 | 35 | 45 | 20 | 97.9 | 88.815 | 4200 | 10.4 | 26.23 | 1.462 | 141.00 |
| 76 | 32.5 | 45 | 22.5 | 96.35 | 87.607 | 5000 | 9.5 | 25.85 | 1.446 | 141.50 |
| 77 | 30 | 45 | 25 | 96.09 | 87.945 | 5000 | 8.9 | 24.36 | 1.430 | 142.00 |
| 78 | 27.5 | 45 | 27.5 | 95.59 | 87.661 | 5000 | 9.2 | 22.71 | 1.415 | 142.00 |
| 81 | 27.5 | 47.5 | 25 | 95.277 | 87.674 | 5000 | 9.7 | 27.34 | 1.435 | 147.00 |
| 82 | 25 | 47.5 | 27.5 | 94.22 | 87.393 | 5000 | 9 | 25.44 | 1.419 | 147.50 |
| 83 | 27.5 | 50 | 22.5 | 96.873 | 88.617 | 4300 | 14.7 | 28.76 | 1.455 | 152.50 |
| 84 | 25 | 50 | 25 | 95.738 | 88.327 | 5000 | 13.1 | 26.67 | 1.439 | 152.50 |
| 88 | 15 | 50 | 35 | 86.68 | 86.153 | 5000 | 16.7 | 28.46 | 1.380 | 153.00 |
| 89 | 12.5 | 50 | 37.5 | 93.54 | 87.677 | 5000 | 15.6 | 25.52 | 1.365 | 153.50 |
| 90 | 7.5 | 50 | 42.5 | 94.76 | 87.576 | 5000 | 24.4 | 26.04 | 1.338 | 153.50 |

-continued

| S.NO. | F.B. | TB | E.B. | Hiding | Whiteness | Wet Scrub | Gloss @ 85° | Colour Strength | WPL | Cost/Ltr (Rs.) |
|---|---|---|---|---|---|---|---|---|---|---|
| 91 | 56 | 30 | 14 | 97.5 | 86.867 | 1400 | 6.7 | 29.28 | 1.473 | 107.00 |
| 126 | 10 | 40 | 50 | 91.387 | 87.837 | >5000 | 40 | 23.76 | 1.285 | 134.50 |
| 127 | 10 | 45 | 45 | 89.379 | 87.44 | >5000 | 30 | 23.86 | 1.317 | 144.00 |
| 128 | 15 | 40 | 45 | 86.853 | 86.667 | >5000 | 17.7 | 25.28 | 1.310 | 134.00 |
| 129 | 17 | 38 | 45 | 88.93 | 86.239 | >5000 | 15 | 23.13 | 1.307 | 130.00 |
| 130 | 12.5 | 42.5 | 45 | 84.822 | 87.415 | >5000 | 19.5 | 19.59 | 1.314 | 139.00 |
| 131 | 15 | 40 | 45 | 86.225 | 86.221 | 5000 | 15 | 20.1 | 1.310 | 134.00 |
| 132 | 17.5 | 37.5 | 45 | 85.24 | 85.763 | 5000 | 14 | 20.19 | 1.307 | 129.00 |
| 133 | 20 | 35 | 45 | 83.735 | 85.65 | 5000 | 15.3 | 22.1 | 1.303 | 124.00 |
| 134 | 25 | 32.5 | 42.5 | 85.287 | 85.843 | >5000 | 11.4 | 21.33 | 1.312 | 119.00 |
| 135 | 27.5 | 30 | 42.5 | 80.261 | 85.351 | 5000 | 11.8 | 20.65 | 1.309 | 114.00 |

S.No. Serial Number
F.B. Filler Base - Paint ingredient comprising mainly of blend of extender pigments like Talc, China clay, Calcite, etc.
TB Titanium Dioxide Base - Paint ingredient comprising mainly of Titanium dioxide.
E.B. Emulsion Base - Paint ingredient mainly comprising high binding Emulsion Polymer along with rheological modifiers.
Hiding Contrast Ratio
WPL Weight per liter in Kg's.

The above data has been arrived at based on the accepted and recognized standards for the purpose. Accordingly the following standards have been utilized for preparing the data:

1. Paint Opacity or hiding measured as Contrast Ratio as per ASTM 2805. Paint opacity will determine the covering capacity, higher the contrast ratio better will be the covering capacity.
2. Whiteness measured as Whiteness Index as per ASTM D2244
3. Wet Scrub measured as No. of strokes of brush on Wet Abrasion Tester before failure as per ASTM D 2486-96 using 1% soap solution instead of scrub media
4. Colour strength or depth of colour, which can be achieved on addition of stainers, measured as Reflectance index (ASTM D 5326-94), higher the reflectance index, lower will be the colour depth.
5. Cost/Liter of paint in Indian rupees or any other currency of choice.
6. Stain resistance measured as loss of whiteness in dE value, which is the colour difference between painted panel before staining and after washing off the stain as per ASTM D3258-73.
7. Gloss measured on Gloss-meter at 85° angle.
8. Covering Capacity measured as sq. mt./liter of Paint, which is empirically arrived at by applying the Paint and measuring the spreading rate for giving good coverage of the surface.

Every possible combination of the above ingredients is characterized for these 8 paint properties by experimentation. This matrix correlating various possible combinations of these ingredients to its 8 properties are taken into consideration. This information will be upgraded continuously.

The device has been fabricated in such a way that it is possible to translate/convert/produce/suit the customer's requirements of the paint properties. After the selection and desired proportions of the ingredients are determined, commands are given through the control system to prepare the desired paint.

Figure 3:
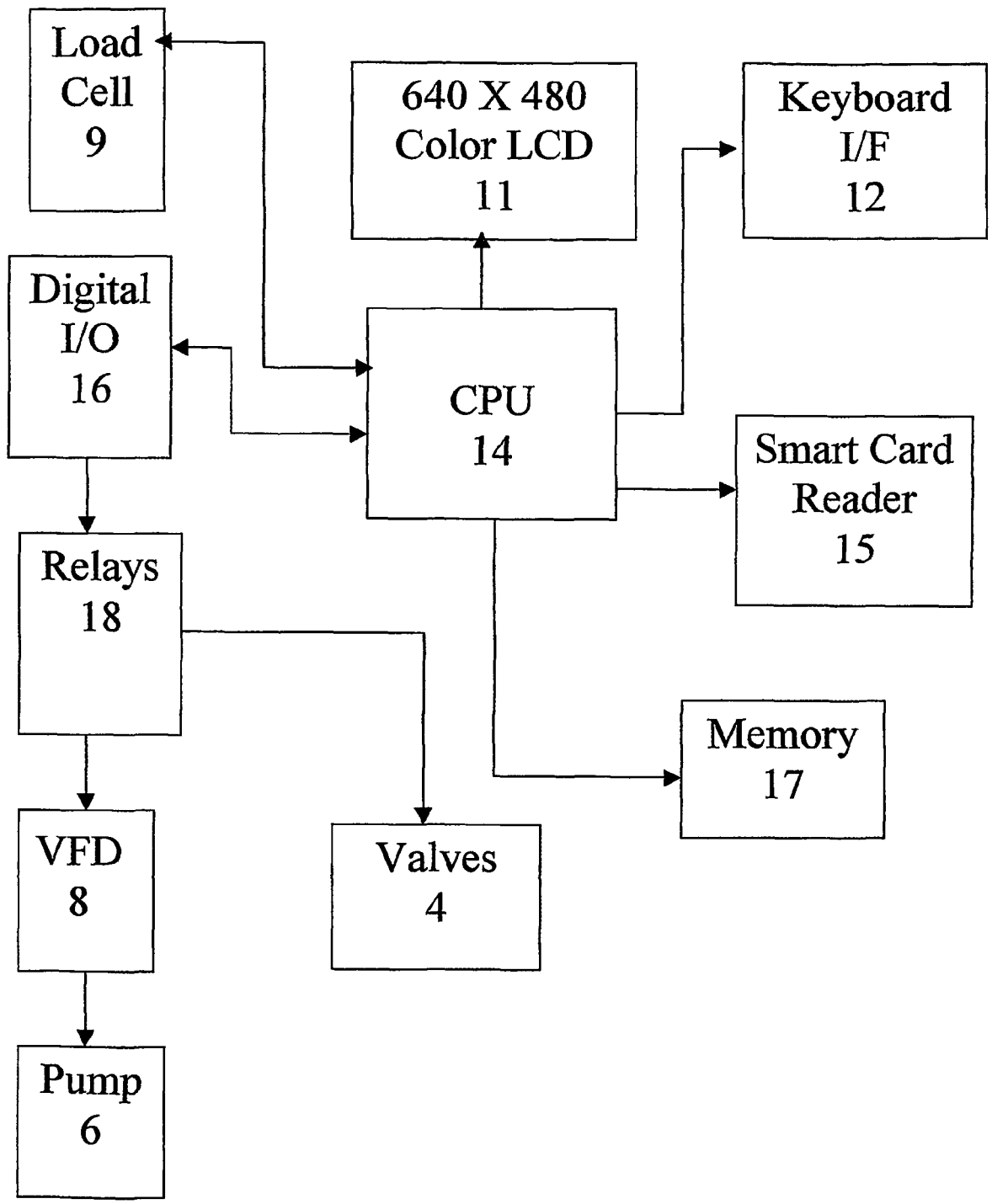
FIG. 3 represents the electronic connections of the Control system of the device of the present invention.

The control system is a device, which can be an embedded control on a personal computer or a programmable logic controller. The control system used is fabricated specially for use in the device of the present invention. As stated above, the system is shown in FIG. 3. The system should have essentially the following controller features:

1. It should have user interface in the form of display and keyboard
2. It should be able to take input from one load-cell
3. It should have adequate memory or data storage for storing recipes
4. It should be able to control the electrically operated valve through relay outputs
5. It should be compact
6. It should have expansion possibility for future requirements The system should also have basic functional inputs for the following:

1. The controller to take the weight as input and activate valves and pump to dispense desired quantities.
2. The controller to take input from the user and determine the recipe.
3. The controller to dispense each ingredient as per recipe Based on above requirements, a control system has been fabricated comprising (a) Display Driver Display driver drives the human interface. Functionally the controller needs only text interface. For better presentation, the LCD with display of 256 colours and a resolution of 640×480 (256 colour) TFT LCD pixels is considered.

(b) Keyboard Interface

The keyboard used may be a dust and water-resistant with Membrane keypad User interacts with paint dispensing system using this keyboard.

(c) Data Storage and Calculation

Since the number of paint grades can be infinite, the data related to corresponding properties and quantity of ingredients is stored at very small intervals of combination of ingredients. Data can be for infinite combinations, but build up of data will be on a continuous basis and will be appended periodically on the machine by replacing the smart card.

(d) Memory

The system will have 2 types of memory. First will be flash memory to store programs and data that does not need to be secured. There will be also RAM (random access memory) to store dynamic data that will be needed during program execution.

(e) Digital I/O

The central processing unit interacts with valves and pump through digital I/O card. The pumps and valves operate from 230 V AC supply. This I/O is isolated from CPU using opto-coupler output.

(f) Relays

Optically isolated relays are provided for isolation between I/O and the field components like valves and pumps to avoid accidental high voltage short circuit damage to the control system.

While fabricating the control system, other considerations such as real time clock for date and time, Switched Mode Power Supply are considered, based on actual requirements.

DESCRIPTION OF THE SOFTWARE FOR OPERATING THE PAINT DIDPENSING DEVICE

The description of the software for operating the paint-dispensing device of the present invention is given with reference to FIG. 5. The software as shown in FIG. 5 consists of four components, namely, Security Component (A), Paint Selection Component (B), Paint Dispensing Component (C) and Maintenance Component (D). The paint-dispensing device is booted by switching on the power supply. The Security Component of the software performs authorization of the smart card. The user has to insert a smart card into the smart card reader (FIG. 3, #15) and enter a pin code via a keypad FIG. 3, #12). The Security Component of the software validates the pin-code. Upon successful authorization, the Paint Selection Component (B) displays the Main Screen (B1) that allows the user to either choose from designing his/her own desired paint or select a market equivalent paint as the case may be.

If the user chooses to design his/her own paint, the Design Own Paints screen (B2) will be displayed. All the respective parameters or properties for the desired paint will have to be entered into this screen (B2). The Paint Selection Component (B) will then query the Paint Database (B3) that is stored in the smart card in a 256 bit encrypted format, and display the resulting paint parameters, price and required volume onto the Design Own Paint screen (B2). If the user modifies any of the paint properties and parameters, the new price and quantity are subsequently displayed onto the Design Own Paint screen (B2). By selecting the confirmation button on the Design Own Paint screen (B2), the Paint Selection Component (B) stores the selected paint parameters (B4) into the control system memory (FIG. 3, #17). The Paint Dispensing Component (C) subsequently reads the selected paint parameters from memory.

If the user chooses to select a market equivalent paint, the market equivalent paints screen (B5) will be displayed. The Paint Selection Component (B7) will subsequently retrieve the list of all the available market equivalent paints from the market equivalent paint Database (B6) stored in the smart card in 256 bit encrypted format After the user selects the desired market equivalent paint, the resulting price of the paint and the required volume are displayed on the market equivalent paint screen (B5). If the user modifies the market equivalent paint properties and parameters, the new price and quantity are subsequently displayed on the market equivalent paints Screen (B5). After confirmation, the selected paint parameters (B7) are sent to the Paint Dispensing Component.

The Paint Dispensing Component (C) calculates the required quantity of each paint ingredient required for the final desired paint mixture. It, then, starts to dispense each paint ingredient sequentially into a container (FIG. 1, #7) by operating the valves (FIG. 1, #4) and pump (FIG. 1, #6). Once the final required quantity of the desired paint mixture is achieved, the paint dispensing process stops and then the Paint Selection Component (B) displays the Main Screen (B1).

Upon pressing a key code through the keyboard (FIG. 3, #12), on the Main Screen (B1), the Paint Selection Component (B) will validate the key. If it is the maintenance key code, the Maintenance Component (D) will display the Maintenance Screen (D1) that will consist of various maintenance options. Based on the selection of the user, the Maintenance Component (D) will process the respective maintenance request. If the back button on the Maintenance Screen (D1) is selected, the Main Screen (B1) will be displayed.

SEQUENTIAL OPERATION OF DISPENSING DEVICE

The details of sequence of operation of the device of invention as described in the sequential operation below which are given only for illustration purposes and therefore should not be construed to limit the scope of present invention.

The sequential operation of the dispensing process is described below.

1. The level of the ingredient in the tank is checked.
2. The total required volume of the desired paint to be dispensed in each bucket is calculated
3. Repeat steps mentioned below for each bucket
4. The required weights of the desired ingredients are calculated.
5. The weight of the each ingredient which is to be dispensed is also calculated
6. Open the valve of the filler base.
7. Wait for the response of the limit switch
8. If the response is not received within 12 seconds it indicates a valve error which has to be checked and rectified. If response is received, proceed further.
9. Operate the pump at coarse speed for dispensing the filler base.
10. Get the load cell reading.
11. If the load cell reading doesn't increase by 0.5 in 80 iteration, it indicates a pump error, which has to be rectified. If increased, proceed further.
12. The weight of the ingredients so far dispensed is calculated.
13. If the weight dispensed so far is equal to the 50% of the weight to be dispensed then go directly to step 16.
14. Otherwise, if the weight dispensed so far is equal to the 80% of filler base quantity (50% of weight to be dispensed for filler base) then change the pump speed to fine speed.
15. Go to step 10.
16. Close the pump.
17. Close the valve.
18. Wait for the response of the limit switch.
19. If the response is not received within 12 seconds, it indicates a valve error, which has to be rectified, otherwise proceed further.
20. Open the valve of the TiO2 base.
21. Wait for the response of the limit switch.

22. If response is not received within 12 seconds, it indicates a valve error, which has to be rectified, otherwise proceed further.
23. Open the pump at coarse speed for dispensing the TiO2 base.
24. Get the reading of the load cell.
25. If the load cell reading doesn't increase by 0.5 in 80 iterations, it indicates a pump error, which has to be rectified.
26. The weight dispensed so far is calculated.
27. If the weight dispensed so far is equal to the weight to be dispensed from titanium base then go to step 30.
28. Otherwise if the weight dispensed so far is equal to the 80% of weight to be dispensed for titanium base then change the pump speed to fine speed.
29. Go to step 24.
30. Close the pump.
31. Close the valve.
32. Wait for the response of the limit switch.
33. If the response is not received within 12 seconds, it indicates a valve error, which has to be rectified, otherwise proceed further.
34. Open the valve of the emulsion base.
35. Wait for the response of the limit switch.
36. If response is not received within 12 seconds, it indicates a valve error, which has to be rectified, otherwise proceed further.
37. Open the pump at coarse speed of the emulsion base.
38. Get the reading of the load cell.
39. If the load cell reading doesn't increase by 0.5 in 80 iterations, it indicates a pump error, which has to be rectified, otherwise proceed further.
40. The weight of the ingredients dispensed so far from the emulsion base is calculated.
41. If the weight dispensed so far is equal to the weight to be dispensed from emulsion base then go to step 44.
42. Otherwise if the weight dispensed so far is equal to the 80% weight to be dispensed for emulsion base then change the pump speed to fine speed.
43. Go to step 38.
44. Close the pump.
45. Close the valve.
46. Wait for the response of the switch.
47. If the response is not received within 12 seconds, it indicates a valve error, which has to be rectified, otherwise proceed further.
48. Open the valve of the filler base.
49. Wait for the response of the limit switch.
50. If the response is not received within 12 seconds it indicates a valve error, which has to be rectified, otherwise proceed further.
51. Open the pump at coarse speed of the filler base.
52. Get the reading of the load cell.
53. If the load cell reading doesn't increase by 0.5 in 80 iterations, it indicates a pump error, which has to be rectified, otherwise proceed further.
54. The weight dispensed so far from the filler base is calculated.
55. If the weight dispensed so far is equal to the 50% of weight to be dispensed from the filler base then go to step 58.
56. Otherwise if the weight dispensed so far is equal to the 80% of (50% of weight to be dispensed) filler base then change the pump speed to fine speed.
57. Go to step 52.
58. Close the pump.
59. Close the valve.
60. Wait for the response of the limit switch.
61. If the response not received within 12 seconds it indicates a valve error, otherwise proceed further.
62. Store the record of the dispensing process in the database.
63. Go back to the first screen.

WORKING OF THE PAINT DISPENSING DEVICE

The working of the device of the present invention is explained below

Figure 4:
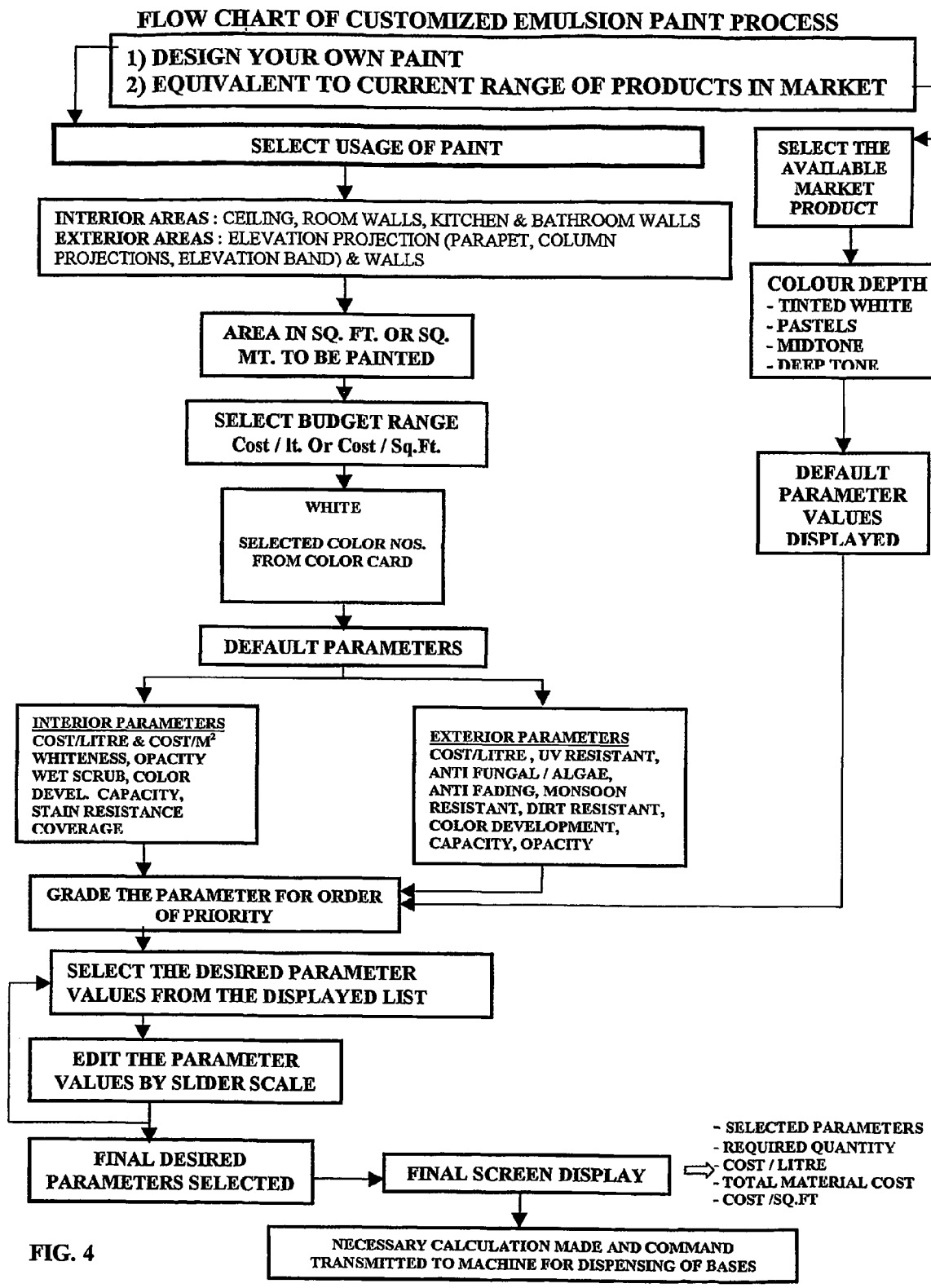
FIG. 4 represents the flow chart showing the operation of the device.

A. Designing one's own Paint
   If Design Own Paint is selected, display Design Own Paint screen
   Input room type
   Display default values for the properties based on the room type and display the closest paint values from database, including price
   Modify Highest Priority
   Display new paint values from database and update the price based on the highest priority.
   Modify Colour Strength
   Display new paint values from database and update the price
   Modify Budget
   Display new paint values from database and update the price
   Enter Area and select area unit (square meter or square feet)
   Calculate the volume of the paint required based on the area entered and total price
   Display the volume and total price
   Fine tune (modify) the properties wet scrub, hiding, whiteness, stain resistance
   For all the above modified properties, display nearest paint values from database and update price, volume
   Click on Next (arrow) button to go to the Confirm Paint screen or click on back button to go back to the main screen B. Market Equivalent Paint
   If market equivalent paint is selected, display market equivalent paint screen
   Select a market equivalent paint grade
   Display default values for the properties based on the market equivalent paint selected and display the nearest paint values from the database, including price
   Modify Colour Strength
   Display new paint values from database and update the price
   Modify Budget
   Display new paint values from database and update the price
   Enter Area and select area unit (square meter or square feet)
   Calculate the volume of the paint required based on the area entered and total price
   Display the volume and total price
   Fine tune (modify) the properties wet scrub, hiding, whiteness, stain resistance
   For all the above modified properties, display nearest paint values from database and update price, volume
   Click on Next (arrow) button to go to the Confirm Paint screen or click on back button to go back to the main screen Confirm Screen
  Display total price and total volume of the paint selected
  Display the various service pack options
  Select one service pack
  Click on Confirm button to start dispensing or Modify button to go back to the previous screen Maintenance Screen
  If maintenance key code is pressed, display Maintenance screen
  Enter Login ID using keypad
  Enter Password
  Check if ID and password are correct
  If any are incorrect, re-enter ID and password and validate
  If any are again incorrect, repeat above three steps once more and exit if authorization fails
  If ID and password are correct, display the Maintenance Options screen Modify In-Flight Screen
  If Modify In-flight option is selected, display Modify In-flight screen
  Display in-flight weights
  Enter new in-flight weights
  Select Store button
  Store new in-flight weights into file
  Return to Maintenance Options screen Modify Inertial Screen
  If Modify Inertial option is selected, display Modify Inertial screen
  Display inertial weights
  Enter new inertial weights
  Select Store button
  Store new inertial weights into file
  Return to Maintenance Options screen Modify Percentage
  If Modify Percentage option is selected, display Modify Percentage screen
  Display weight change percentages
  Enter new percentages
  Select Store button
  Store new percentages into file
  Return to Maintenance Options screen View Logs
  If View Logs option is selected, display View Logs screen
  Display dispensed batch list
  Select a batch from the list
  Select Show Details button
  Show the details of the selected batch in a Details window
  Click on Hide Details button
  Remove the Details window
  Return to dispensed batch list
  If Cancel is selected, return to Maintenance Options screen The following sequential operations have to be effected as shown in FIG. 4:

Step 1: Selecting of the desired Paint

In the first step for the manufacturing process of the paint using the device of the present invention, the operator starts the sequence by pressing the 'START' key. User has to select the paint category i.e., design one's own paint or any equivalent paint available in the market After the selection, the related screen will be shown in the panel screen. The user has to select the desired area to be painted, room details, budget range, etc. and set the default parameter. If the user is happy with the current selection then he/she has to click the next button as explained in the Step 2 given below.

Step 2: Selecting the parameter

As per the user's selection in Step 1, he/she will get the set of parameters as per the budget range selected in Step 1.

The first list view will provide the list of existing parameters that is available in the budget range selected in the Step 1. If the user again wants to modify the already selected parameters in step 1 as per the budget, then he has to set the budget from the slider bar provided. After setting the budget, click on the SET BUDGET button.

This action will filter the existing list.

The customer can again filter the existing records by increasing or decreasing the 5 parameters provided. The result of these selections will be shown in the second list view. If the customer is satisfied with his selection, then, he can click the NEXT button, as explained below which will take him to the confirmation page.

Step 3: Confirmation of the Paint Selected

After the customer has set the default parameters he/she comes to this page where he/she has to confirm his/her selection. Here he/she has to select the package quantity that he/she wants. After selecting the package quantity the cost per litre is shown and the total cost. If the customer is sure of his/her selection and the package quantity he/she can submit the paint combination by clicking the SUBMIT button. This will take him/her to the process page where the preparation process of the selected paint begins.

Step 4: Starting the Paint Making Process

The device is installed at an outlet such as the retailer's outlet. The customer can select the required paint through a Menu Driven system. After selection of the process data by the customer, the ingredient quantity will be downloaded to the device for the following sequential operation:

1. The customer starts the sequence by pressing a single membrane key. Then the first ingredient line's electrically operated valves opens & pump starts automatically.
2. The variable frequency drive (VFD) connected to the pump will have few sets of I/O contacts for predefined speed. Speed is decided based on the weight range (two speeds for each recipe definable range up to say 5/15/25 Kg.) and not on the type of the ingredient.
3. First the pump will run at higher speed. After dispensing 80% of required quantity, based on load cell indication, the speed will be reduced to second set value.
4. The pump will stop after addition of required quantity of the first ingredient.
  After time gap of a few seconds (recipe definable), the electrically operated valve will close.
5. The same procedure (1 to 3) is to be followed for the $2^{nd}$ & $3^{rd}$ ingredient dispensing sequentially.
6. For thorough homogenous mixing of the ingredients, the filled paint container is closed, removed and mixed. The mixing may preferably be done by keeping it inside the gyroshaker for a period of say, about 3 minutes.
7. After dispensing the required number of paint containers, the water cleaning operation can be started manually. The user will operate a membrane key on the panel to open the water inlet valve, and continue till desired cleaning is achieved. (The effluents generated will be collected in an external container & later same will be returned to supplier of Paint ingredients, for Effluent treatment).

The details of using the device of the invention is described in the examples given below which are given only for illustration purposes and therefore should not be construed to limit the scope of the present invention.

EXAMPLE 1

A customer comes to a Point of Sale (retailer's shop), for his requirement of paint for coating interior room walls of his house measuring 500 sq. mtr. in pastel fight) colour. His budget for the paint is for $1^{st}$ quality Emulsion Paint of about Rs.160/liter or Rs.10/sq. mtr. The customer feeds his inputs into the human machine interface available in the form of membrane keyboard in an embedded control system or a computer, and menu driven process starts as shown in flow chart FIG. 4 as detailed below:

Step 1: Select—Design your own paint.
Step 2: Select—Interior Room Walls.
Step 3: Enter area to be painted as 500 sq. mtr.
Step 4: Select budget range as $1^{st}$ quality or enter value as Rs.160/liter.
Step 5: Select colour depth—Pastels.
Step 6: Select highest priority property—Wet Scrub.
Step 7: Default options of paint with highest wet scrub possible in given cost of Rs.160/litre and with which, pastel shade can be achieved. These options are picked up based on inputs given in Steps 1 to 6.
Step 8: Iterate other properties i.e. opacity, whiteness, stain resistance & gloss on a slider scale. This iteration automatically revises the option.
Step 9: Select best option. If still not satisfied, go back to Step 8 for further iteration of properties.
Step 10: Final option selected.
Step 11: Display of selected paint properties, quantity required, cost/liter and cost/sq. mtr. and total material cost If satisfied, select—'Submit'.
Step 12: Ingredients are computed from database, which match the selected paint properties.
Step 13: Commands are given to the device, which starts the pump and opens the valve to dispense computed quantity of each ingredient to make the required total quantity of paint in multiples of biggest pack sizes.
Step 14: Filled pack is closed and taken out and kept inside a gyroshaker or (any other type of mixing device) and mixed for 3 minutes to give final paint having the customer defined and designed properties.

At the end of the above operation, the paint designed by the customer having the desired properties and the cost is produced, to the customer's satisfaction.

EXAMPLE 2

A customer comes to a point of sale (Retailer's shop), for his requirement of a paint equivalent to some market equivalent paint "Brand X" for his house measuring 500 sq. mtr. in pastel colour. The customer gives his inputs into the human machine interface available in the form of membrane keypad of embedded control system or a computer, and menu driven process starts as shown in flow chart shown in FIG. 4 as detailed below:

Step 1: Select—Equivalent to some market available paint "Brand X".
Step 2: Select Colour depth—Pastels.
Step 3: Default option of paint with equivalent parameters to "Brand X" is derived for pastel shade.
Step 4: Iterate other properties i.e., opacity, whiteness, wet scrub & gloss on a slider scale to mix & max the desired parameters to be changed. This iteration automatically revises the option.
Step 5: Select best option. If still not satisfied, go back to Step 8 for further iteration of properties.
Step 6: Final option selected.
Step 7. Display of selected paint properties, quantity required, cost/litre and cost/sq. mtr. and total material cost. If satisfied, select—'Submit'.
Step 8: Ingredients are computed from database, which match the selected paint properties.
Step 9: Commands are given to the device which starts the pump and opens the valve to dispense computed quantity of each ingredient to make the required total quantity of paint in multiples of biggest pack sizes.
Step 10: Filled pack is closed and taken out and kept inside a gyroshaker and mixed for 3 minutes to give final paint having the customer defined and designed properties.

At the end of the above operation the paint designed by the customer having the desired properties and the cost is produced.

EXAMPLE 3

A customer comes to a point of sale Retailer's shop), for his requirement of paint for painting kitchen room walls of his house measuring 100 sq. mtr. in pastel colour. His budget for the paint is for emulsion paint of about Rs.160/litre or Rs.10/sq. mtr. The customer gives his inputs into the human machine interface available in the form of membrane keypad of embedded control system or a computer, and menu driven process starts as shown in flow chart shown in FIG. 4 as detailed below:

Step 1: Select—Design your own paint (emulsion paint).
Step 2: Select—kitchen room walls.
Step 3: Enter area to be painted as 100 sq. mtr.
Step 4: Select budget range, enter value as Rs.160/litre.
Step 5: Select colour depth—Pastels.
Step 6: Select highest priority property—Stain resistance.
Step 7: Default options of paint with highest stain resistance possible in given cost of Rs.160/litre and with which, pastel shade can be achieved. These options are picked up based on inputs given in Step 1 to Step 6.
Step 8: Iterate other properties i.e., opacity, whiteness, wet scrub & gloss on a slider scale. This iteration automatically revises the option.
Step 9: Select best option. If still not satisfied, go back to Step 8 for farther iteration of properties.
Step 10: Final option selected.
Step 11: Display of selected paint properties, quantity required, cost/liter and cost/sq. mtr. and total material cost. If satisfied, select—'Submit'.
Step 12: Ingredients are computed from database, which match the selected paint properties.
Step 13: Commands are given to the device, which starts the pump and opens the valve to dispense computed quantity of each ingredient to make the required total quantity of paint in multiples of biggest pack sizes.
Step 14: Filled pack is closed and taken out and kept inside a gyroshaker and mixed for 3 minutes to give final paint having the customer defined and designed properties.

At the end of the above operation the paint designed by the customer having the desired properties and the cost is produced.

Advantages of the device of the present invention:
1. The device has the options to determine the cost, usage and functional properties i.e. coverage, opacity or hiding, whiteness, wet scrub, colour depth, stain resistance, gloss, etc. of the paint
2. Infinite number of variations possible for all parameters—present bulk manufacturers have 4-5 grades as economy, premium, deluxe, etc.

3. The device can be used for manufacturing desired quantity, which may be small or large.
Presently manufacturing is done in bulk, which is in large quantity.
4. The customer-defined paint can be manufactured using the device at the point of sale.
5. The customer-defined/designed paint can be manufactured within a few minutes
6. The coarse & fine feed arrangement is done by pump speed variation, not by the varying valve opening thereby cutting off dispensing instantly without residual dripping.
7. There is no valve on the pump discharge pipe. Whenever the pump stops, the ingredient residual in the pipe comes down to the corresponding ingredient can under gravity, without further addition to the final paint container. This helps in reducing the weight variation of dispensed ingredient.
8. As the device is a menu driven control system, the process of manufacturing paint employing the device is very much reliable.
9. There is no wastage of paint as the customer manufactures the paint as per his actual requirements.
10. The device can be operated by a layman, meaning that no special skill is required.

I claim:

1. A device for instant manufacture of customized paint, which comprises a container housing at least two cans for holding the ingredients useful for preparing the paint, each can being provided with an opening through which the cans are interconnected by means of a first pipe, the first pipe being provided with valves which operate on electronic signals for adjusting the flow of the said ingredients from the said cans a second pipe being connected to a pump for pumping the said ingredients from the said cans into a paint container, the pump being provided with a variable frequency drive VFD for varying the flow rate of the quantities of the said ingredients from the said cans to the container, the paint container being removably placed on a weighing platform, for weighing the paint formed in the paint container, the weight being transmitted to a control system to control the variable frequency drive VFD, pump and valve, the control system, comprising an embedded controller having a LCD (liquid crystal display) provided with a central processing unit, the output of weighing platform being connected to the central processing unit, one terminal of the central processing unit being connected to the LCD (liquid crystal display), a second terminal of the central processing unit being connected to a smart card, a third terminal of the central processing unit interacting with the memory, a fourth terminal of the central processing unit being connected to the input of the digital input/output device, a fifth terminal of the central processing unit being connected to membrane keyboard for human interface, the output of the digital input/output device being connected to a relay board, and the output of the relay board being connected to the variable frequency drive and to the valves.

2. A device as claimed in claim 1 wherein the container is partly closed and is provided with doors at appropriate places.

3. A device as claimed in claim 2 wherein the bottom of the container is provided with rollers to facilitate easy installation of the cans inside the container.

4. A device as claimed in claim 3 wherein the device contains three cans for holding the ingredients, each can containing the following ingredients (i) filler base (ii) TiO2 base and (iii) emulsion base.

5. A device as claimed in claim 4 wherein the filler base comprises a blend of extenders, the extenders comprising one or more of talc, china clay, or calcite.

6. A device as claimed in claim 4 wherein the TiO2 base comprises rutile titanium dioxide.

7. A device as claimed in claim 4 wherein the emulsion base comprises a high binding acrylic emulsion polymer along with rheological modifiers.

8. A device as claimed in claim 1 wherein the openings in the cans are at their top.

9. A device as claimed in claim 1 wherein the first pipe is made of PVC and the second pipe is made of stainless steel.

10. A device as claimed in claim 1 wherein the valves provided in the first pipe are motorized valves.

11. A device as claimed in claim 1 wherein the pump used is a screw pump.

12. A device as claimed in claim 1 wherein the cans used to hold the ingredients are of suitable size, being about 50 liters, 100 liters, 150 liters, or 200 liters, based on the appropriate use of the device at the point of sale (retailer or stockist or depot).

13. A control system for use in a device as defined in claim 1 which comprises an embedded controller having a LCD (liquid crystal display) provided with a central processing unit the output of weighing platform being connected to the central processing unit one terminal of the central processing unit being connected to the LCD (liquid crystal display), second terminal of the central processing unit being connected to a smart card, the third terminal of the central processing unit interacting with the memory, the fourth terminal of the central processing unit being connected to the input of the digital input/output device, the fifth terminal of the central processing unit being connected to membrane keyboard for human interface, the output of the digital input/output device being connected to a relay board and the output of the relay board being connected to the variable frequency drive, and to the valves.

14. A control system for use in a device as claimed in claim 1 wherein the display device is a LCD (liquid crystal display) with 256 color and a resolution of 640×480 TFT LCD pixels.

15. A control system as claimed in claim 13 wherein the keyboard interface used is a dust and water-resistant membrane keypad.

* * * * *